(12) United States Patent
Hostvedt et al.

(10) Patent No.: US 8,423,411 B2
(45) Date of Patent: Apr. 16, 2013

(54) SYSTEMS AND METHODS FOR DISPLAYING VISUAL INFORMATION

(75) Inventors: Erik T. Hostvedt, Pipersville, PA (US); Paul Speese, Doylestown, PA (US)

(73) Assignee: Motors Drives & Controls, Inc., Hatfield, PA (US)

( * ) Notice: Subject to any disclaimer, the term of this patent is extended or adjusted under 35 U.S.C. 154(b) by 316 days.

(21) Appl. No.: 12/820,258

(22) Filed: Jun. 22, 2010

(65) Prior Publication Data

US 2011/0191172 A1 Aug. 4, 2011

Related U.S. Application Data

(60) Provisional application No. 61/299,544, filed on Jan. 29, 2010.

(51) Int. Cl.
*G06Q 30/00* (2006.01)

(52) U.S. Cl.
USPC .................. 705/14.63; 705/14.62; 705/14.49

(58) Field of Classification Search ............... 705/14.63, 705/14.62, 14.49
See application file for complete search history.

(56) References Cited

U.S. PATENT DOCUMENTS

| | | | |
|---|---|---|---|
| 5,507,109 A * | 4/1996 | Rinzler | 40/603 |
| 6,545,596 B1 * | 4/2003 | Moon | 340/425.5 |
| 7,123,376 B2 * | 10/2006 | Shea | 358/1.15 |
| 7,154,383 B2 * | 12/2006 | Berquist | 340/425.5 |
| 7,567,941 B2 * | 7/2009 | Sagi et al. | 705/404 |
| 2004/0264739 A1 * | 12/2004 | Das et al. | 382/101 |
| 2005/0177416 A1 * | 8/2005 | Linden | 705/14 |
| 2009/0076915 A1 * | 3/2009 | Tighe | 705/14 |
| 2009/0234740 A1 * | 9/2009 | Jabbari | 705/14 |
| 2009/0248470 A1 * | 10/2009 | Pintsov et al. | 705/8 |
| 2009/0299857 A1 * | 12/2009 | Brubaker | 705/14.66 |
| 2009/0307087 A1 * | 12/2009 | Haas | 705/14.53 |
| 2010/0063885 A1 * | 3/2010 | Merkin et al. | 705/14.68 |
| 2010/0169138 A1 * | 7/2010 | Sagi et al. | 705/7 |
| 2010/0230328 A1 * | 9/2010 | Bonnell et al. | 209/584 |

OTHER PUBLICATIONS

Intelligent Mail ® Barcode Technical Resource Guide, United States Postal Service, Jun. 30, 2009, pp. 1-18, Rev. 4.1.

* cited by examiner

*Primary Examiner* — John Weiss
*Assistant Examiner* — Sam Refai
(74) *Attorney, Agent, or Firm* — Venable LLP; Steven J. Schwarz

(57) ABSTRACT

Systems and methods are provided for pushing advertisement information from a host computer system to one or more delivery vehicles. Intelligent barcode data (IBD) from mailers is provided to the computer system. Physical mail pieces associated with the mailers are provided to a central processing plant, and manifest data is determined for the one or more delivery vehicles including IBD data from the mailers. The advertising information is pushed in real time to the one or more delivery vehicles from the computer system based on the manifest data and displayed on a display of a given vehicle. The content of the advertising information may be correlated with the delivery of the mail pieces being delivered using the IBD data.

36 Claims, 6 Drawing Sheets

SYSTEMS AND METHODS FOR DISPLAYING VISUAL INFORMATION

CROSS-REFERENCE TO RELATED APPLICATIONS

This application claims the benefit of the filing date of U.S. Provisional Patent Application No. 61/299,544, entitled Systems and Methods for Pushing Advertising Information, filed Jan. 29, 2010, the disclosure of which is hereby incorporated herein by reference.

BACKGROUND OF THE INVENTION

The present invention relates generally to advertising, and specifically to systems and methods for displaying visual information such as advertising correlated to deliverable mail pieces and general interest information to the public.

Companies spend vast sums each year attempting to deliver appropriate advertisements to a receptive audience. These companies use many different marketing techniques and forms of media to present effective advertisements. Each day these advertisements flood our society through traditional methods such as billboards, television and radio, and through new high-tech media such as the Internet. Companies also spend vast sums in advertising in the form of mail pieces delivered to consumers. In this type of advertising, the companies cannot be assured that the targeted audiences will view these mail pieces or simply discard them as being amongst other mail pieces considered as junk mail. There is presently no way to influence and/or increase the interest of the targeted audiences into viewing a given advertiser's mail piece over other advertising mail pieces.

BRIEF SUMMARY OF THE INVENTION

Systems and methods are described for pushing advertising information from a host system to one or more vehicles of a fleet equipped with wireless mobile display systems. The vehicles can service local, regional and national geographic areas, as well as internationally. The advertisements may be correlated to and may relate to the mail pieces to be delivered, such as those pertaining to: products being offered and sold, services being offered, planned events and other deliverables, and information relevant to the public in general or the anticipated consumer within selected geographical areas. Thus, the term "mail pieces" is used in its broadest meaning and includes any type of physical product or deliverable such as, but not limited to, letters, flyers, packages, products, post cards, documents, pamphlets, magazines, advertising material, newspapers, brochures, and the like.

In one aspect of the invention, the advertising information is based upon data obtained from machine readable data such as an intelligent barcode, e.g., the United States Post Office (USPS) Intelligent Mail Barcode (IMB), see "Intelligent Mail Barcode Technical Resource Guide", prepared by the Intelligent Mail Planning and Standards, United States Postal Service, Jun. 30, 2009, Rev. 4.1, the disclosure of which is incorporated herein by reference, which provides visibility to the timing and delivery of specific mail pieces. The host system will push correlated advertising information to wireless mobile display systems residing on delivery vehicles, and will synchronize the delivery of the physical mail pieces within the fleet with the related advertisements that support the mail pieces, as well as optionally competitive advertisements if desired. The advertising information can be pushed based upon the vehicles known routes and/or specific locations in real time using GPS technology and utilizing localized information to display geographically relevant advertising or other information relevant to the public.

In one aspect of the invention, graphical and written advertising information, including optional sounds such as speech and music, can be communicated to digital displays mounted on United States Postal Service (USPS) Vehicles from a Host Computer System via a Wireless Wide Area Networks (WWAN). The advertising information can be specific to the route and/or location of each vehicle based upon known USPS delivery routes. Additionally, the advertising information can be specifically tailored or correlated to the exact mail pieces or mail category that is in the vehicle scheduled for delivery based upon information from, for example, an intelligent barcode such as the USPS Intelligent Mail Barcode tracking system information. The system can schedule customized advertising information for each mail piece and every delivery vehicle (e.g., 200,000+ vehicle fleet) for every route for each day that the delivery vehicle is scheduled to deliver mail pieces to the route. The advertising information can be sent from the Host Computer System directly over the WWAN to the specific fleet vehicle or in some cases where the coverage of the WWAN is not adequate, a secondary WWAN known as the 900 MHz FLEX Paging Networks (FPN) will prompt an On Board Embedded Computer (OBEC) residing on the delivery vehicle to serve up the specific advertisement. The OBEC will receive its instructions and store the relevant advertisements via an IEEE802.11 (WIFI) network when it is parked at the Delivery Unit (DU) prior to departing for the daily route or receive the information in real time while in route from the host computer system in real time.

In one embodiment of the present invention there is described a method for advertising comprising correlating advertising information using a computer system with mail pieces to be delivered by one or more delivery vehicles; and displaying the correlated advertising information on a display of a delivery vehicle.

In a further embodiment of the present invention there is described a method of pushing advertisement information from a computer system to one or more delivery vehicles, the method comprising providing intelligent barcode data (IBD) from mailers to the computer system; providing mail pieces to a central processing plant; determining manifest data for the one or more delivery vehicles; pushing advertising information to the one or more delivery vehicles from the computer system based on the manifest data; and displaying advertising information on a display of a given vehicle correlated with the delivery of the mail pieces being delivered.

In a further embodiment of the present invention there is described a system for advertising information, the system comprising a computer system for receiving data associated with mail pieces to be delivered; a display for displaying the advertising information; and an advertising database for storing the advertising information to be displayed in association with the mail pieces; wherein the computer system pushes the advertising information stored in the advertising database for displaying on the display, the displayed advertising information correlated by the data to the mail pieces.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

DETAILED DESCRIPTION

Figure 1:
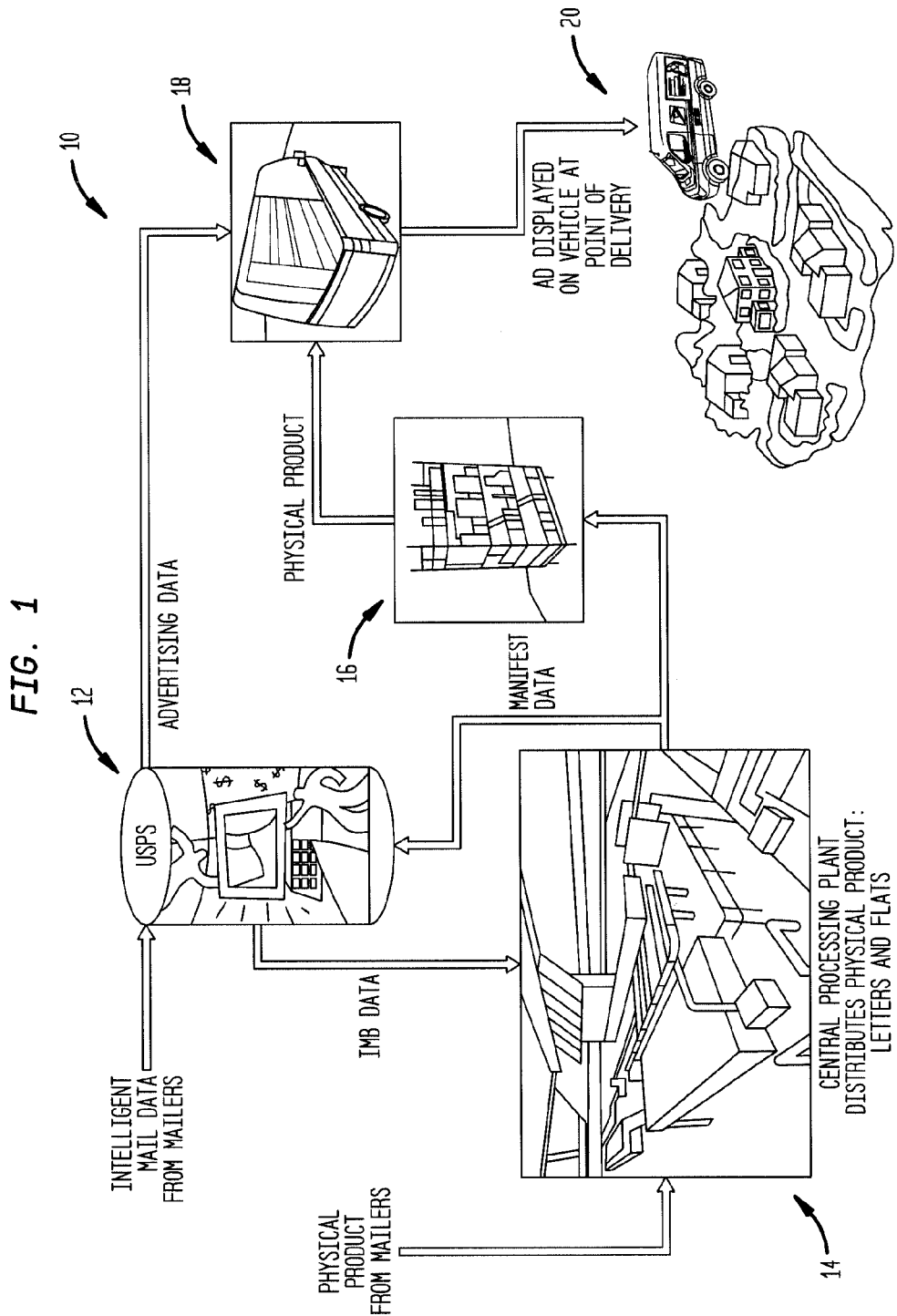
FIG. 1 illustrates a system for pushing advertising information correlated to mail pieces to be delivered from a host computer system to a fleet of vehicles in accordance with one embodiment of the present invention.

In describing the preferred embodiments of the invention illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose.

The present invention will be illustrated in accordance with one embodiment with respect to direct mail advertising delivered by the USPS. However, the present invention is applicable to a variety of other entities (e.g., United Parcel Service (UPS), Federal Express etc.) that deliver packages and products to consumers. FIG. 1 illustrates a system 10 for pushing advertising information from a host computer system to a fleet of vehicles in accordance with one embodiment of the present invention. The system 10 includes a USPS computer network 12 that can include a variety of components such as an Intelligent Mail Barcode (IMB) server, a host server, an advertising server coupled to an advertising database, a WWAN server/router and a flex paging network server controller to name a few by way of example. IMB data supplied by mailers (e.g., printers of the mail pieces or companies whose products/services are featured in the mail pieces) are provided to the USPS computer network 12 and the mail pieces (e.g., physical products) obtained from the mailers are provided to a central processing plant 14 for sorting and distribution. The IMB data, from the USPS computer network 12 is provided to the central processing plant 14, so that the mail pieces can be sorted based on destination location. The IMB data includes information such as a mailer identifier, a mail piece identifier and a destination location. The manifest data indicates which delivery vehicle, time period and route that the mail pieces will travel to its final destination.

More specifically, the Intelligent Mail Barcode may carry a data payload of up to 31 digits comprised of the following elements as shown in Table 1.

TABLE 1

| Type | Field | Field Length (in digits) |
|---|---|---|
| Tracking Code | Barcode Identifier | 2 (2nd digit must be 0-4) |
| | Service Type Identifier | 3 |
| | Mailer Identifier | 6 or 9 |
| | Serial Number | 9 (when used with 6 digit Mailer ID) |
| | | 6 (when used with 9 digit Mailer ID) |
| Routing Code | Delivery Point | 0, 5, 9, or 11 |
| | ZIP Code ™ | |
| Total Data Payload | | 31 (maximum) |

The barcode identifier field is a 2-digit field that is reserved to encode the presort identification that is currently printed in human readable form on an Optional Endorsement Line (OEL)⁻. Generally, this field is left as "00" if an OEL is not printed on the mail piece.

The Service Type Identifier field is a 3-digit field that indicates participation, or the lack of, in various Postal Service programs. Each 3-digit value corresponds to a particular mail class with a particular, combination of service(s).

The Mailer Identifier (Mailer ID or MID) field is a 6-digit or 9-digit number that uniquely identifies a specific mail owner or mailing agent in the mail preparation process who has responsibility for the ownership, content, make up, or preparation of the mail.

The Serial Number is a 6-digit or 9-digit field depending on the length of the Mailer ID. The Serial Number can be populated with a number that uniquely identifies each mail piece (e.g., identifying the product or service being offered, the manufacture or supplier or other unique identification information) becoming a Unique Mailpiece ID. Alternatively the Serial Number may also be populated with a number that is unique to a mailing, becoming a Unique Mailing ID. The uniqueness method is left up to the mailer and can be achieved, among other things, by serializing the mail pieces, embedding Julian date, embedding mailing event, using recipient identifier, using database or mailing record ID.

The routing code field may contain a 5-digit ZIP code, a 9-digit ZIP+4 code, or an 11-digit delivery point code. When used on letters for automation-rate eligibility purposes, the routing code contains a delivery point code from CASS-certified software that accurately matches the delivery address. When used on flat-size pieces for automation-rate eligibility purposes, the barcode contains either a ZIP-4 or a delivery point routing code that accurately matches the delivery address.

The manifest data is provided to the USPS computer network 12 so that the network 12 can determine the approximate location of the vehicles and the mail pieces at a given time. The mail pieces to be delivered bearing the IMB are loaded onto racks 16 and loaded into a delivery vehicle 18. The USPS computer network 12 can employ the mainfest data to push advertising information to the delivery vehicle 18, as well as based on the type and/or content of the mail pieces being delivered. The USPS computer network 12 can be configured to push advertising information to each delivery vehicle in a fleet of vehicles. A given delivery vehicle can include a wireless mobile display system that includes an embedded computer coupled to a display mounted to the outside of the vehicle for displaying the advertising information. The wireless mobile display system can include a GPS device to provide a more exact location of the vehicle during a delivery time period so that the computer network 12 and/or the embedded computer residing in the delivery vehicle can synchronize the advertising information to be displayed on the outside of the vehicle with the delivering of the mail pieces supplied by the mailers and its associated advertising information at the point of deliver 20. In this manner, the recipients of the mail pieces are also provided with displayed advertising in hopes of facilitating the recipients in viewing the advertising information in the mail pieces.

Figure 2:
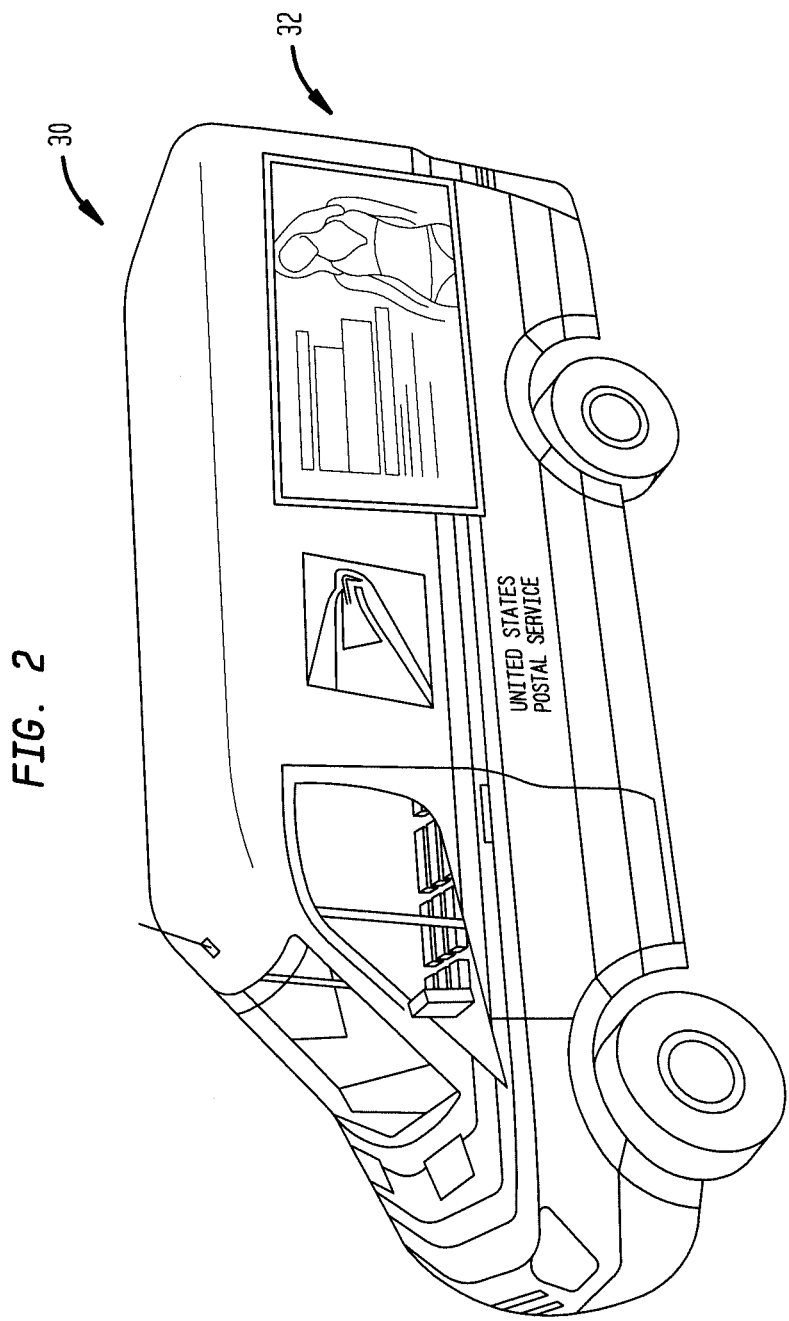
FIG. 2 illustrates a USPS delivery vehicle having a display residing on a first side of an outside of the delivery vehicle in accordance with one embodiment of the present invention.

FIG. 2 illustrates a USPS delivery vehicle 30 having a display 32 residing on a first side of an outside of the delivery vehicle in accordance with an aspect of the present invention. The USPS delivery vehicle 30 can also include a second display 32 residing on a second side of the USPS delivery vehicle. The USPS delivery vehicle 30 can include a wireless mobile display system that includes an embedded controller that can store and push advertising information to the display (s) 32 residing on the outside of the USPS delivery vehicle 30. The advertising information can be pre-stored in the wireless mobile display system at the delivery unit at the central processing plant or be transmitted in real-time via a WWAN. The display 32 can be a rugged weather and vibration resistant High Definition or similar VGA type display or some other display equipped to be subjected to an outside environment.

Figure 3:
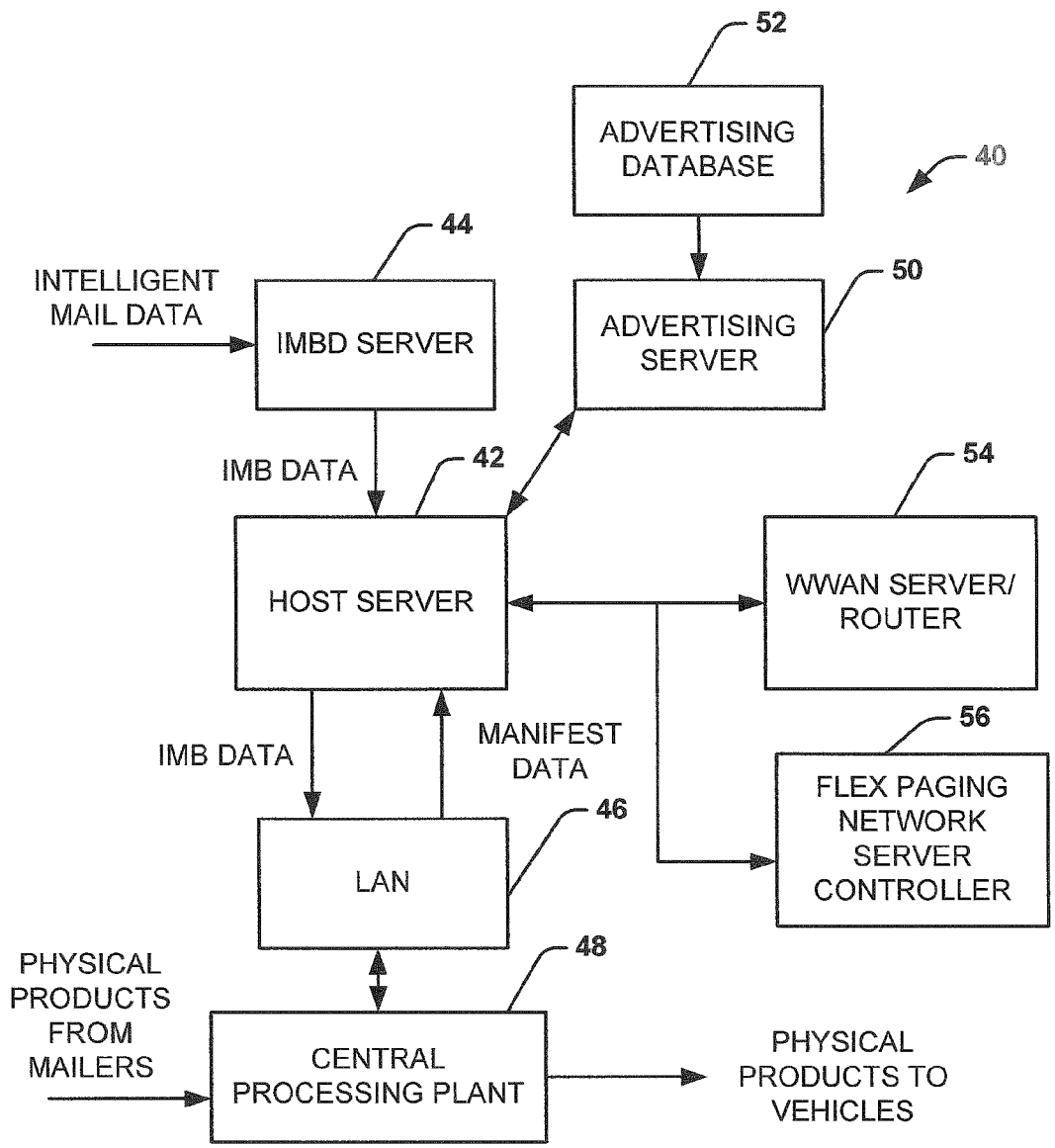
FIG. 3 illustrates a block diagram of a USPS computer network in accordance with one embodiment of the present invention.

FIG. 3 illustrates a block diagram of a USPS computer network 40 in accordance with an aspect of the present invention. The USPS computer network 40 includes a host server 42 that is a main control and interface unit of the USPS computer network 40. The host server 42 provides an interface with an IMB data (IMBD) server 44 and a LAN 46 that services a central processing plant 48. The IMBD server 44 receives and processes intelligent mail data from mailers or other sources provided to the central processing plant 48. The IMB data is provided to the host server 42 from the IMBD server 44. The host server 42 provides the IMB data to the central processing plant 48 through a LAN 46. The central processing plant 48 provides manifest data to the host server 42 through the LAN 46. The manifest data includes information regarding the delivery vehicle, time period and route that the mail pieces will travel to its final destination. The host server 42 also interfaces with an advertising server 50 that accesses an advertising database 52. The advertising server provides advertising information from the advertising database 52 to the host server 42.

The host server 42 can push the stored advertising information to a fleet of delivery vehicles and synchronize the delivery of the physical mail pieces supplied by the mailers within the fleet with advertisements or other information that support the mail pieces. The host server 42 pushes the advertising information directly over a WWAN server/router 54 to the specific delivery vehicle containing the mail piece to be delivered or in some cases where the coverage of the WWAN is not adequate, a 900 MHz FLEX Paging Networks (FPN) server controller 56 will prompt the wireless mobile display system on the delivery vehicle to serve up the specific advertisement.

Figure 4:
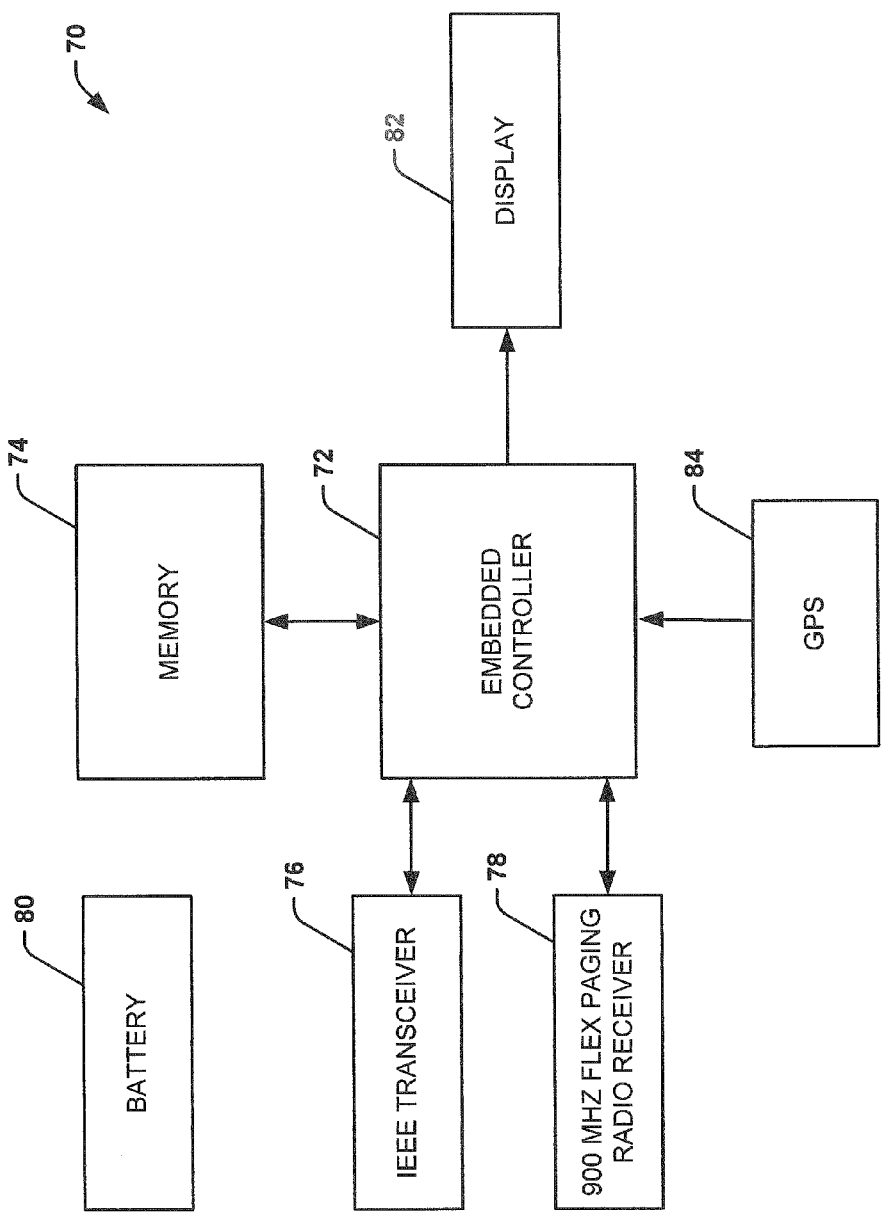
FIG. 4 illustrates a block diagram of a wireless mobile display system in accordance with one embodiment of the present invention.

FIG. 4 illustrates a block diagram of a wireless mobile display system 70 in accordance with an aspect of the present invention. The wireless mobile display system 70 includes an embedded controller 72 that receives and transmits information through a transceiver 76 and a 900 MHZ Flex Paging radio receiver 78. The transceiver 76 can transmit and receive IEEE, Bluetooth, Wi-Fi and/or other transmission protocol. The wireless mobile system 70 also includes a memory 74 for storing advertising information to be displayed to a display 82 residing on an outside of a delivery vehicle. The advertising information can be stored on the delivery vehicle at the central processing unit and invoked by commands transmitted from the host server and/or the advertising information can be transmitted in real-time from the host server and temporarily stored in memory 74 prior to displaying on the display 82.

The wireless mobile display system 70 can also include a global position system (GPS) 84 that provides accurate location information that can be used in conjunction with a delivery time period so that the computer network at the USPS and/or the embedded controller 72 can synchronize the advertising information to be displayed on the outside of the vehicle with the real time delivering of the mail pieces associated with the advertising information at the point of delivery. The wireless mobile display system 70 can also include a battery 80 for providing power to the wireless mobile display system 70. The battery 80 can be the vehicle battery or a battery dedicated to the wireless mobile display system 70. The wireless mobile display system 70 can also be configured as a "Hotspot", such that the transceiver 76 or another dedicated transceiver 76 can broadcast advertising messages via IEEE, Bluetooth, Wi-Fi or other transmission protocol in coordination with the displays that would provide requests to consumers to open their smart phones or digital devices to accept communications and advertising offers from the vehicle.

Figure 5:
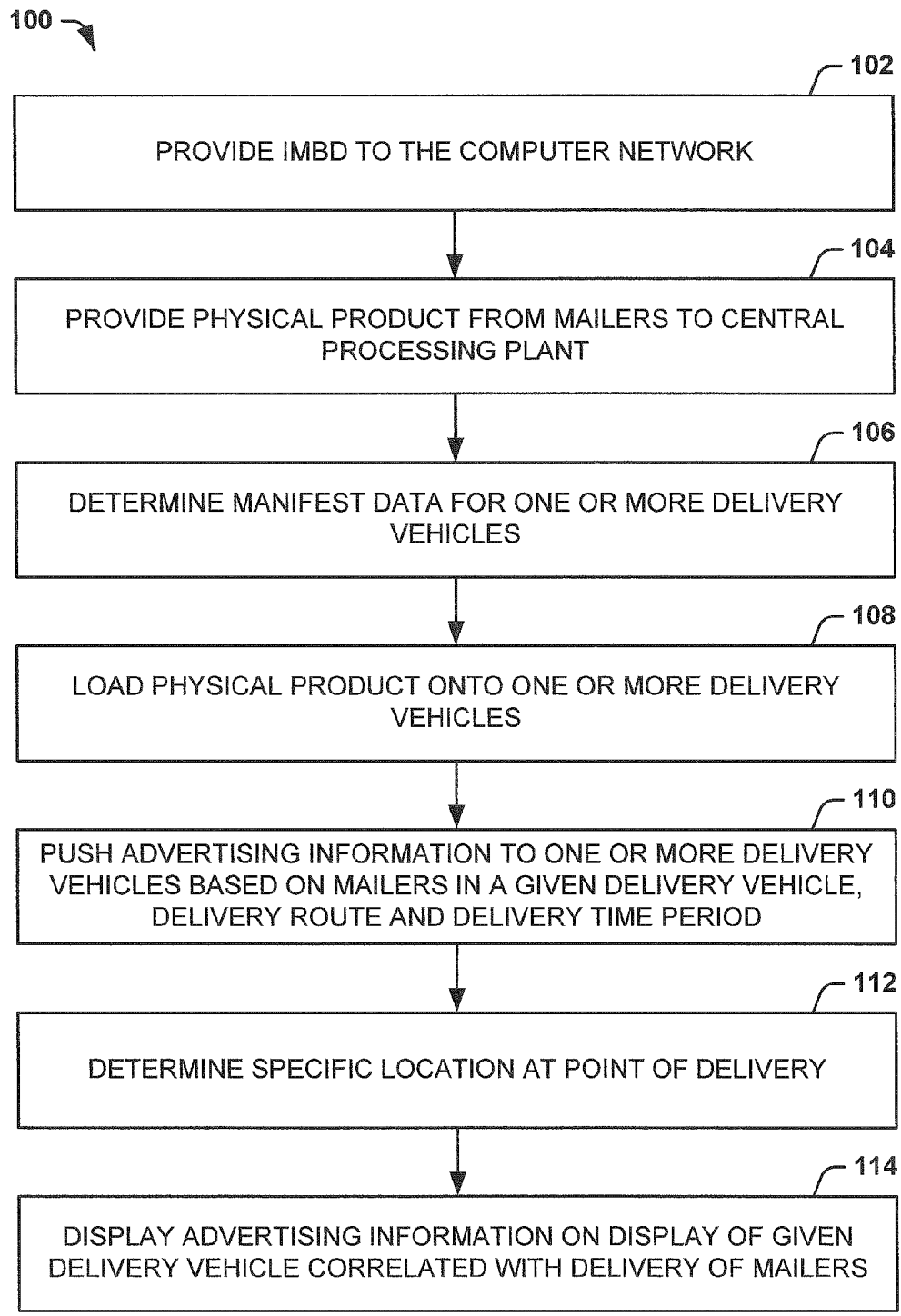
FIG. 5 illustrates an example of a method for pushing advertising information from a host computer system to one or more delivery vehicles in accordance with one embodiment of the present invention.

In view of the foregoing structural and functional features described above, a methodology in accordance with various aspects of the present invention will be further appreciated with reference to FIG. 5. While, for purposes of simplicity of explanation, the methodologies of FIG. 5 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 5 illustrates an example of a method 100 for delivering advertising information from a host system to one or more delivery vehicles in accordance with an aspect of the present invention. At 102, IMBD or other data formats from new mail pieces are provided to the computer network of the USPS. At 104, the physical mail pieces from the mailers are provided to the central processing plant. At 106, manifest data for delivering the physical mail pieces are is determined for one or more delivery vehicles. At 108, the mail pieces loaded onto the one or more delivery vehicles. The methodology then proceeds to 110. At 110, advertising information is pushed to one or more delivery vehicles based on the mail pieces in a given delivery vehicle, the delivery route and the delivery time period. At 112, the specific location (e.g., via GPS) is determined at the point of delivery. At 114, advertising information is displayed on a display of a given delivery truck correlated with delivery of specific mail pieces at the point of delivery.

Figure 6:
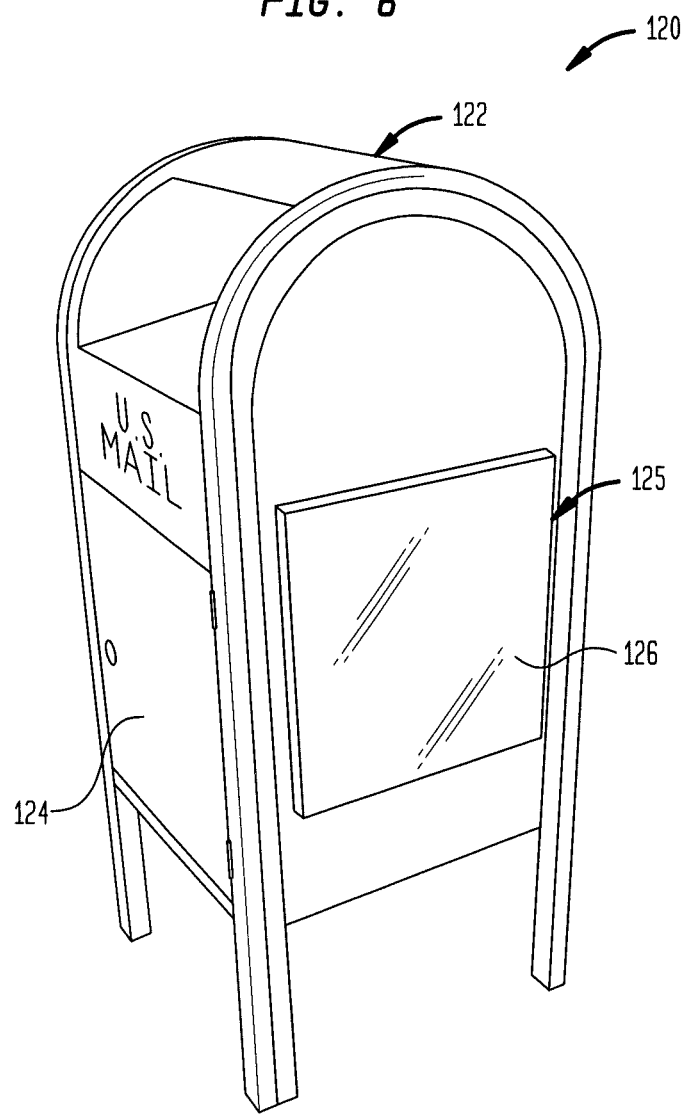
FIG. 6 illustrates an advertising information display system in accordance with one embodiment of the present invention.

FIG. 6 illustrates an advertising information display system 120 in accordance with another embodiment of the present invention. The system 120 is in the nature of a free standing mail piece storage unit 122 such as typically used by the United States Postal Service. The storage units 122 are of the type typically located throughout a geographical location for pick up by the mail carrier of bulk mail to be delivered. The storage unit 122 is provided with a locked access door 124 for securing the mail pieces and other deliverables. In this manner, a postal carrier while on route, may stop at one of the storage units 122 for picking up mail to be delivered, without the need to return to the post office facility.

The storage unit 122 can be provided with a wireless display system 125 such as previously described. The storage unit 122 is also provided with one or more displays 126, such as the type as previously described with respect to displays 32 residing on a delivery vehicle 30. Advertising information to be correlated with the mail pieces to be delivered within the storage unit 122 may be stored and pushed to the display 126 in the manner as previously described. In this regard, the advertising information may be stored on an advertising server residing in the computer system at a remote location, or residing within the storage unit 122. Each of the mail pieces will contain an intelligent barcode or other data to enable correlation of the mail pieces to the advertising information to be displayed. Accordingly, the advertising information may be pushed either remotely to the wireless display system 125 in the manner as previously described or directly from an advertising information storage device residing within the storage unit 122. In either event, the advertising information may be pushed to the display 126 at selected times as may be desired or determined from the manifest data.

What have been described above are examples of the invention. It is, of course, not possible to describe every conceivable combination of components or methodologies for purposes of describing the invention, but one of ordinary skill in the art will recognize that many further combinations and permutations of the invention are possible. For example, other data forms other than the IMB data may be used for correlating the advertising information to the mail pieces. Accordingly, the invention is intended to embrace all such alterations, modifications, and variations that fall within the scope of this application, including the appended claims.

What is claimed is:

1. A method for advertising comprising:
    correlating advertising information using a computer system with mail pieces to be delivered by one or more delivery vehicles; and
    displaying the advertising information correlated with the mail pieces on a display of a delivery vehicle containing the mail pieces.

2. The method of claim 1, further including receiving intelligent barcode data associated with the mail pieces by the computer system.

3. The method of claim 2, further including receiving the mail pieces associated with the intelligent mail barcode data at a central processing plant.

4. The method of claim 2, wherein the intelligent barcode uniquely identifies the mail pieces.

5. The method of claim 2, further including determining manifest data for the delivery vehicle.

6. The method of claim 5, further including pushing the correlated advertising information to the delivery vehicle from the computer system based on the manifest data.

7. The method of claim 6, wherein pushing the advertising information to one or more delivery vehicles from the computer system based on manifest data comprises pushing advertising information based on the mail pieces in the delivery vehicle, the delivery route of the delivery vehicle, and a delivery time period.

8. The method of claim 1, further comprising determining a specific location at a point of delivery of the mail pieces and displaying the advertising information correlated with the delivery of the mail pieces at the specific location at the point of delivery.

9. The method of claim 1, wherein the computer system is a United States Postal System computer network and the delivery vehicles are one or more United States Postal System delivery vehicles.

10. The method of claim 1, further comprising broadcasting advertising messages from the delivery vehicles to electronic devices of one or more consumers.

11. The method of claim 1, further including receiving intelligent barcode data associated with the mail pieces by the computer system, wherein the intelligent barcode uniquely identifies the mail pieces; and displaying on at least one of the delivery vehicles advertising information correlated to at least one of the mail pieces based on the intelligent barcode on the mail piece being delivered.

12. A method of pushing advertisement information from a computer system to one or more delivery vehicles, the method comprising:
    receiving intelligent barcode data (IBD) from mailers by the computer system;
    receiving mail pieces to be delivered by the one or more delivery vehicles at a central processing plant;
    determining manifest data for the one or more delivery vehicles by the computer system;
    correlating advertising information using the computer system and the intelligent barcode data with mail pieces to be delivered by the one or more delivery vehicles;
    pushing the advertising information to the one or more delivery vehicles from the computer system based on the manifest data; and
    displaying the advertising information on a display of a given vehicle based on the mail pieces on the given vehicle for delivery by the given vehicle.

13. The method of claim 12, wherein pushing the advertising information to the one or more delivery vehicles from the computer system based on manifest data comprises pushing advertising information based on mail pieces in the given delivery vehicle, the delivery route of the given delivery vehicle and a delivery time period.

14. The method of claim 12, further comprising determining a specific location at a point of delivery using the computer system and displaying the advertising information correlated with the delivery of the mail piece associated with the mailers at the specific location at the point of delivery.

15. The method of claim 12, wherein the computer system is a United States Postal System (USPS) computer network and the one or more delivery vehicles are one or more USPS delivery vehicles.

16. The method of claim 12, further comprising broadcasting advertising messages from the one or more delivery vehicles to electronic devices of one or more consumers.

17. The method of claim 12, wherein the advertising information is correlated to the mail pieces being delivered based upon data from the IBD.

18. A system for advertising information, the system comprising:
    a computer system adapted to receive data associated with mail pieces to be delivered;
    a display located on a delivery vehicle for delivering the mail pieces, the display adapted to display the advertising information; and
    an advertising database adapted to store the advertising information to be displayed in association with the mail pieces;
    wherein the computer system pushes the advertising information stored in the advertising database for displaying on the display, and the advertising information displayed on the display is based on the mail pieces located on the delivery vehicle for delivery by the delivery vehicle.

19. The system of claim 18, wherein the advertising database resides on the delivery vehicle.

20. The system of claim 18, wherein the advertising database resides in the computer system.

21. The system of claim 18, wherein the data comprises intelligent barcode data provided on the mail pieces.

22. The system of claim 21, wherein the computer system includes an intelligent barcode data server adapted to receive the data from the mail pieces.

23. The system of claim 18, further including a stationary storage unit adapted to store the mail pieces, the display being supported by the storage unit.

24. A system for displaying advertising information on a delivery vehicle, comprising:
   a delivery vehicle containing mail pieces to be delivered by the delivery vehicle;
   a display mounted on the delivery vehicle for displaying the advertising information; and
   a computer adapted to correlate the advertising information with the mail pieces on the delivery vehicle for delivery by the delivery vehicle.

25. The system of claim 24, further comprising an advertising database storing the advertising information, wherein the advertising database resides on the delivery vehicle.

26. The system of claim 24, further including a global positioning system adapted to identify the position of the delivery vehicle in real time.

27. The system of claim 24, wherein the mail pieces are associated with machine readable data.

28. The system of claim 27, wherein the data includes the identity of a mailer, an identity of the mail pieces, and the delivery destination location of the mail pieces.

29. A system for pushing advertising information to at least one delivery vehicle, comprising:
   at least one delivery vehicle for delivering mail pieces contained thereon;
   an advertising database storing advertising information correlated with the mail pieces contained on the at least one delivery vehicle;
   a computer adapted to push the advertising information stored in the database correlated with the mail pieces to the at least one delivery vehicle for displaying on the display; and
   a display supported by the at least one delivery vehicle for displaying advertising information correlated with the mail pieces contained on the at least one delivery vehicle.

30. The system of claim 29, further including a global positioning system adapted to identify the position of the delivery vehicle in real time.

31. The system of claim 29, wherein the mail pieces are associated with machine readable data.

32. The system of claim 31, wherein the data includes the identity of a mailer, an identity of the mail pieces, and the delivery destination location of the mail pieces.

33. A method for pushing advertising information to a delivery vehicle, comprising:
   storing advertising information on an advertising database;
   correlating the advertising information to mail pieces to be delivered using a computer system;
   pushing the advertising information stored on the database using the computer system to a display on a delivery vehicle containing the correlated mail piece to be delivered; and
   displaying the advertising information on the display on the delivery vehicle.

34. The method of claim 33, further including receiving intelligent barcode data associated with the mail pieces by the computer system.

35. The method of claim 33, further including determining manifest data for the delivery vehicle using the computer system.

36. The method of claim 33, further comprising determining a specific location at a point of delivery of the mail pieces and displaying the advertising information correlated with the delivery of the mail pieces at the specific location at the point of delivery.

* * * * *